United States Patent [19]

Alford

[11] Patent Number: 5,220,255
[45] Date of Patent: Jun. 15, 1993

[54] INTERFACE FOR INTERCONNECTING A THERMOSTAT AND AN ELECTRONICALLY COMMUTATED MOTOR

[75] Inventor: Malcolm L. Alford, Euless, Tex.

[73] Assignee: Lennox Industries Inc., Dallas, Tex.

[21] Appl. No.: 596,227

[22] Filed: Oct. 12, 1990

[51] Int. Cl.⁵ .............................................. H02P 6/02
[52] U.S. Cl. .................................... 318/254; 318/138; 318/439; 236/74 A; 236/DIG. 9
[58] Field of Search ................................ 318/138-139, 318/439, 254, 430; 236/DIG. 9, 67, 74 A, 91 R, 91 D

[56] References Cited

U.S. PATENT DOCUMENTS

| | | | |
|---|---|---|---|
| 3,912,162 | 10/1975 | Bauer et al. | 363/11 |
| 4,005,347 | 1/1977 | Erdman | 318/254 |
| 4,015,182 | 3/1977 | Erdman | 318/254 X |
| 4,499,408 | 2/1985 | Bitting et al. | 318/254 |
| 4,500,821 | 2/1985 | Bitting et al. | 318/254 |
| 4,540,921 | 9/1985 | Boyd, Jr. et al. | 318/254 |
| 4,636,936 | 1/1987 | Boyd, Jr. et al. | 318/254 X |
| 4,648,551 | 3/1987 | Thompson et al. | 236/49 |
| 4,707,646 | 11/1987 | Thompson et al. | 318/434 X |
| 4,734,628 | 3/1988 | Bench et al. | 318/599 |
| 4,757,241 | 7/1988 | Young | 318/254 |
| 4,763,347 | 8/1988 | Erdman | 318/254 |
| 4,806,833 | 2/1989 | Young | 318/254 |
| 4,978,896 | 12/1990 | Shah | 318/254 |

FOREIGN PATENT DOCUMENTS 60-142124  7/1985  Japan .

Primary Examiner—William M. Shoop, Jr.
Assistant Examiner—David Martin
Attorney, Agent, or Firm—Allegretti & Witcoff, Ltd.

[57] ABSTRACT

An interface is disclosed for operatively interconnecting a conventional thermostat and an electronically commutated motor ("ECM"). The interface provides enable, heating and rate signals to the ECM in response to the conventional fan, heat, valve and airflow signals from the thermostat.

6 Claims, 4 Drawing Sheets

Fig.5
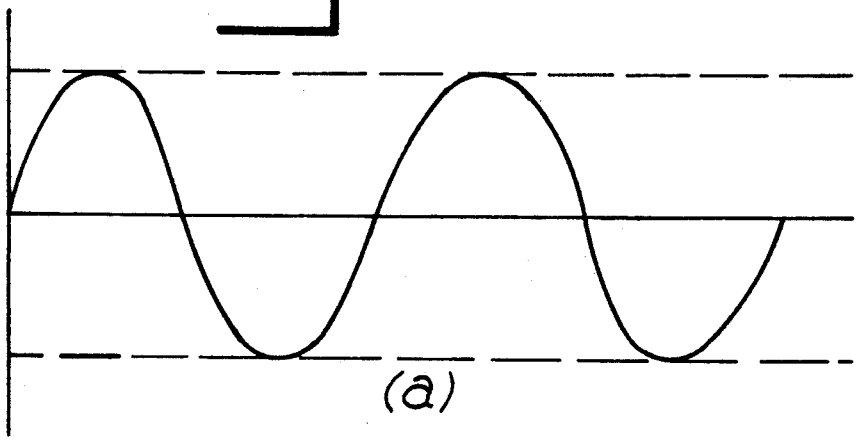
(a)
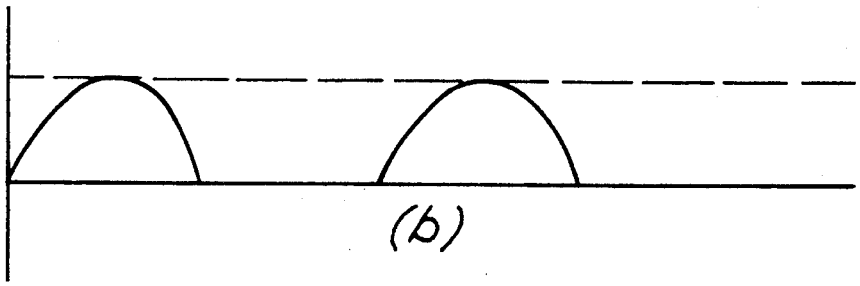
(b)
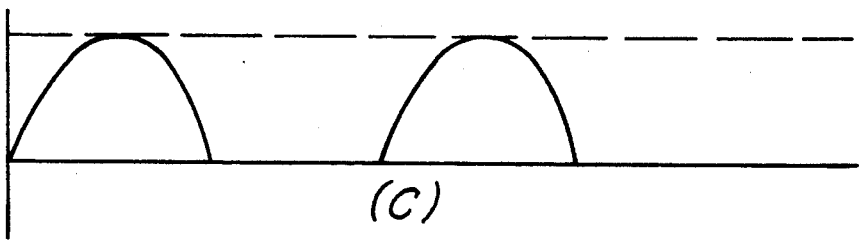
(c)
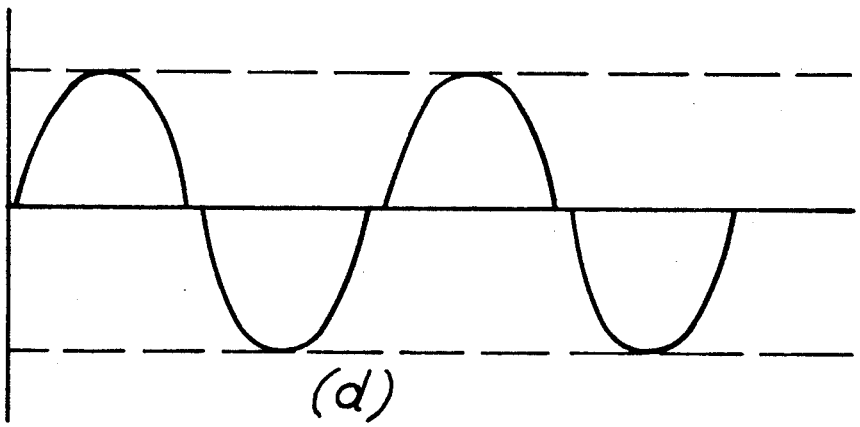
(d)

INTERFACE FOR INTERCONNECTING A THERMOSTAT AND AN ELECTRONICALLY COMMUTATED MOTOR

BACKGROUND OF THE INVENTION

The present invention relates generally to an apparatus for processing air in an enclosure and more particularly to an interface for interconnecting a thermostat and an electronically commutated motor operating as a part of an air moving system.

Air conditioning apparatus utilizing an electronically commutated motor ("ECM") are presently available. In general terms, these ECM air moving systems provide processed air to an enclosure at a predetermined, relatively constant air flow rate, usually specified in cubic feet per minute ("CFM"). The details of one such system are described in U.S. Pat. Nos. 4,806,833; 4,540,921; 4,169,990; and 4,005,347; the teachings thereof are incorporated herein by reference.

More specifically, the speed of the ECM is varied to provide the predetermined CFM flow of processed air to the enclosure. This is in contrast to the more conventional, fixed speed blower mechanisms in which the flow rate of processed air varies with direct static pressure.

An ECM system offers several advantages. The first and most significant is efficiency, particularly at low speeds. An ECM system can be forty percent more efficient than a conventional tapped induction motor system, providing in addition more than twice the range of operational speeds. Second, the efficient nature of the ECM system is self-maintained, i.e., it is not affected by system conditions such as dirty air filters. The system continuously adjusts the speed of the ECM to provide the desired CFM. Third, the ECM system lends itself to simple installation while maintaining a high degree of precision for a given air volume application. That is, the ECM system eliminates much of the "guess work" associated with any given installation and the appropriate blower speeds.

The air processing apparatus, as a whole, and the ECM system, in particular, are responsive to a thermostat located within the enclosure. The presently available thermostats vary in kind and operation, but usually provide a series of 24 volt (RMS) AC signals.

SUMMARY OF THE INVENTION

In a principal aspect, the present invention is an interface between the thermostat and the ECM air moving system of an air processing apparatus. The interface has universal application, i.e., the interface functions with all types of thermostats (including mechanical and electronic) and all types of ECM systems (including the continuously variable ECM utilizing pulse width modulation for airflow rate control).

The interface is adapted to receive the following signals from the thermostat—a fan signal, heat signal, airflow signal and valve signal. The interface is coupled to the three inputs of the ECM. Significantly, the interface only operates in response to the thermostat and only controls the ECM.

In response to the thermostatic signals, the interface provides an ENABLE signal, a HEATING signal and a RATE signal. The ENABLE signal is coupled to the on/off input of the ECM and operates as an enable/disable control. The interface enables the ECM whenever the thermostat requests heating, cooling or ventilation.

The HEATING signal corresponds to a thermostatic request for supplemental heating and is coupled to the heating input of the ECM. In response, the ECM operates at a predetermined heating airflow rate.

The RATE signal is coupled to the high/low input of the ECM and sets the ECM cooling airflow rate. In one aspect of the present invention, the RATE signal is a pulse width modulated ("PWM") signal, which allows the ECM cooling airflow rate to be continuously varied within a prescribed range.

It is thus an object of the present invention to provide a safe, low-cost interface for an air processing apparatus including a thermostat and an ECM air mover. Another object is a thermostat/ECM interface which is universal in nature.

These and other features, objects and advantages of the present invention are set forth or implicit in the following description.

BRIEF DESCRIPTION OF THE DRAWING

Preferred embodiments of the present invention are described herein, in detail, with reference to the drawing wherein:

FIGS. 5a to 5d illustrate various voltage waveforms;

DETAILED DESCRIPTION OF PREFERRED EMBODIMENTS

Figure 1:
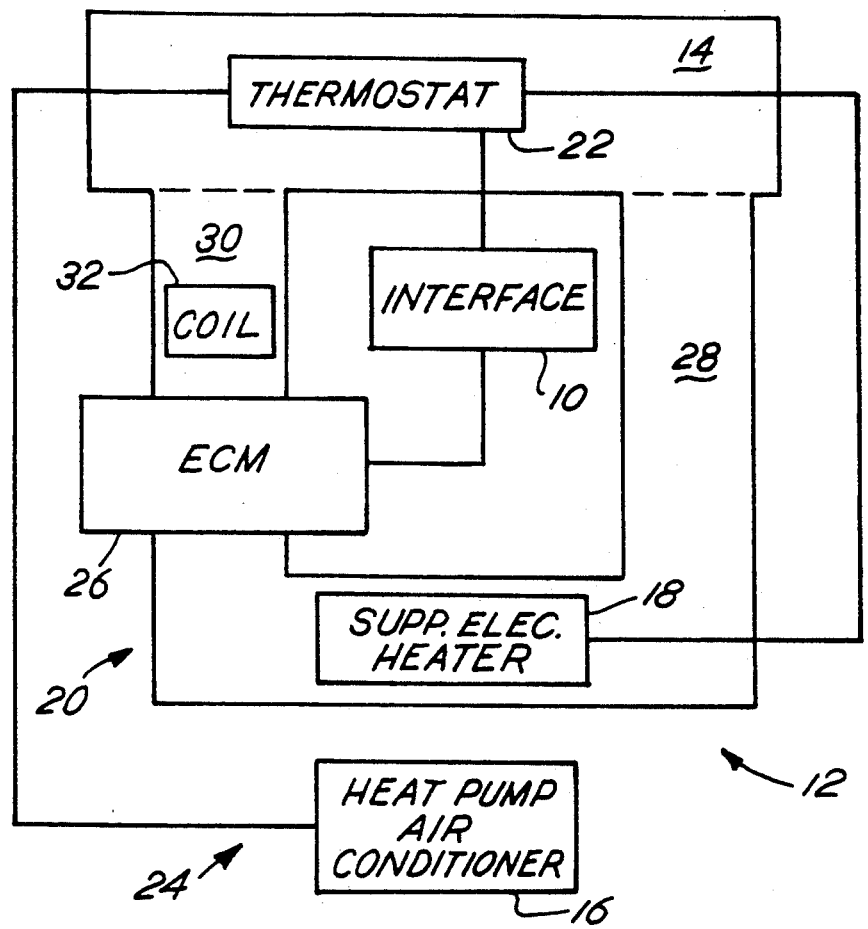
FIG. 1 is a schematic representation of an air processing apparatus including the present invention.

The present invention is shown in FIGS. 1-4 as an interface 10 incorporated into an air processing apparatus 12. The apparatus 12 heats, cools, dehumidifies and circulates air in an enclosure or home 14 by means of a heat pump/air conditioner 16, supplemental electric resistance heater 18, air moving system generally designated 20, and thermostat 22. The heat pump 16, electric heater 18 and air moving system 20 cooperatively define the heating/ventilating/cooling or HVAC system 24 of the air processing apparatus 12.

The air moving system 20 includes an electronically commutated motor or ECM 26 which communicates with the enclosure 14 via conventional return and supply air ducts 28, 30 respectively. As is well known in the art, the heat pump 16 includes an inside coil 32 in communication with the supply air duct 30, i.e., downstream of the ECM 26. The supplemental heater 18 is located within the return air duct 28, i.e., upstream of the ECM 26.

Figure 2:
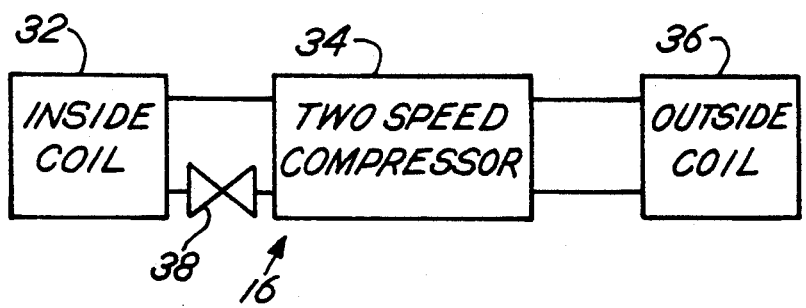
FIG. 2 is a schematic representation of the heat pump/air conditioner shown in FIG. 1.

As best shown in FIG. 2, the heat pump 16 includes a two-speed compressor 34, coupled to the inside coil 32 and an outside coil 36. The mode of operation of the heat pump 16, i.e., heating or cooling, is controlled by a conventional reversing valve 38. In the heating mode, the operational speed of the heat pump 16 is determined by the outside air temperature. The compressor 34 runs at high speed in response to a heating request from the thermostat 22 whenever the outside air temperature is below a predetermined outside air threshold (e.g, 50° F.).

In the cooling mode, the compressor speed is determined by the enclosure temperature. Whenever the enclosure temperature exceeds the set point of the thermostat 22 by more than a cooling threshold (e.g., 2° F.), high speed operation is initiated.

The thermostat 22 is mounted in the enclosure 14 in a conventional manner. The thermostat 22 may be mechanical (such as General Electric Type 3AAT85D-38A2) or electrical (such as White-Rodgers Type 1F94-1).

Figure 3:
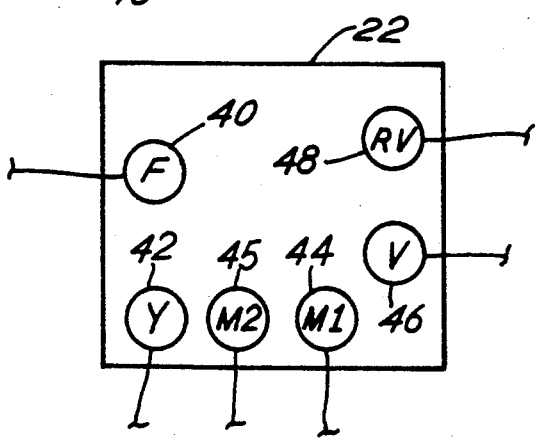
FIG. 3 is a schematic representation of the thermostat shown in FIG. 1.

As is well known in the art, the thermostat 22 senses enclosure temperature and provides various AC output signals to operatively control the HVAC system 24. With particular reference to FIG. 3, the thermostat 22 provides five such signals in this preferred embodiment. They are a fan signal available at a "F" output terminal 40 (sometimes designated the "G" output); a heat signal available at a "Y" output terminal 42 (sometimes designated the "W1" output); a first airflow, or low compressor speed, signal available at a "M1" output terminal 44 (sometimes designated "Y1" output); a second airflow, or high compressor speed, signal available at a "M2" output terminal 45 (sometimes designated the "Y2" output); and a valve signal available at a "RV" output terminal 48 (sometimes designated the "O" output). Each signal is sinusoidal, sixty cycle and twenty-four RMS volts, and a representative waveform is shown in FIG. 5(a).

The fan signal is provided whenever cooling or continuous air circulation is requested, as is well known in the art. The heat signal represents a request for supplemental electric heat, i.e., activation of the supplemental heater 18. The airflow signals available at the "M1" and "M2" terminals 44, 45 are utilized to activate the compressor 34.

The valve signal provided by the thermostat 22 activates the reversing valve 38 of the heat pump/air conditioner 16 to shift from the heating mode to the cooling mode (or vice versa depending on the specific configuration of the air processing apparatus 12). The reverse valve signal therefore represents a request for heat pump or air conditioner operation.

Figure 4:
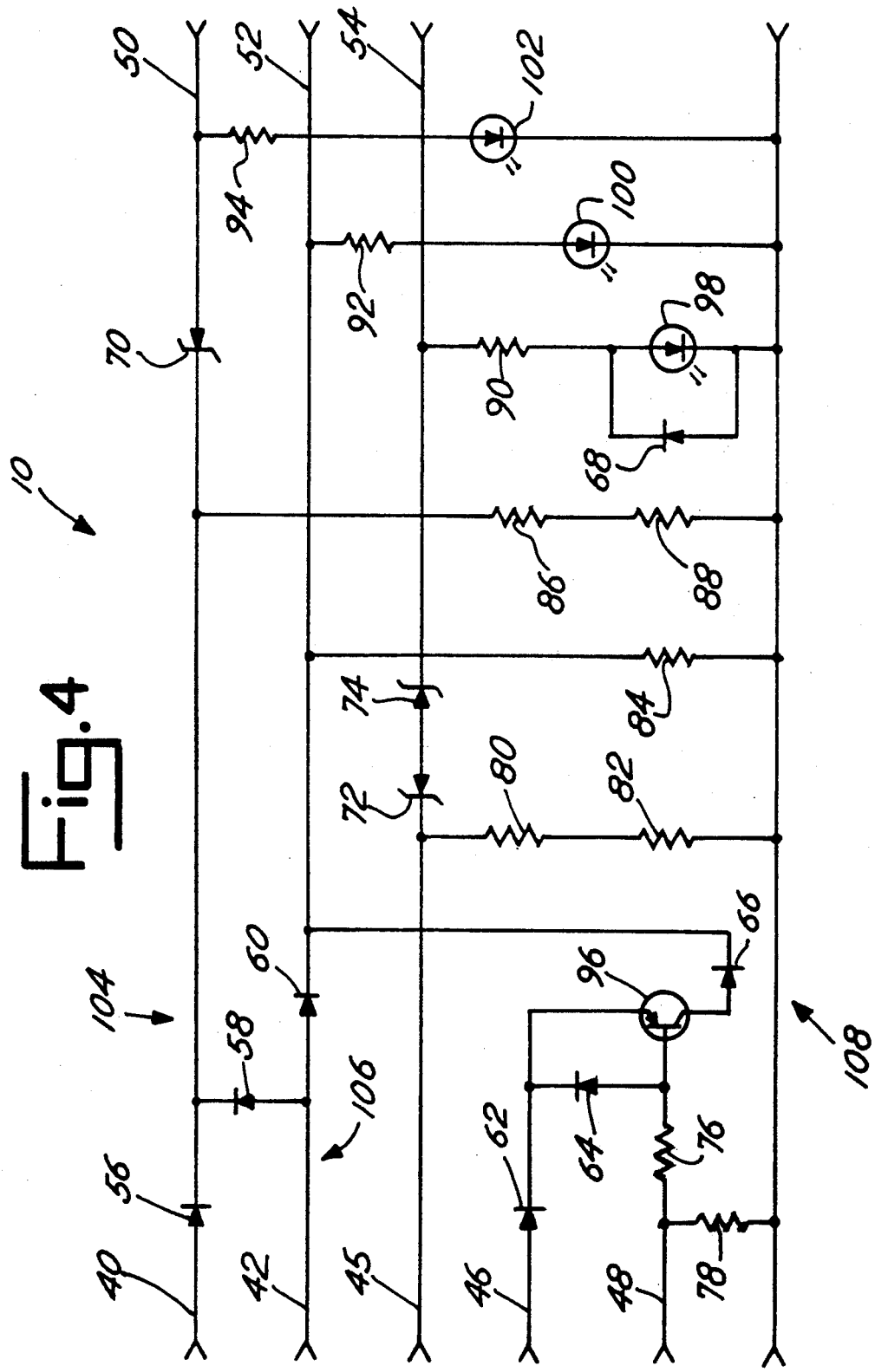
FIG. 4 is an electrical schematic diagram of the present invention.

Referring now to FIG. 4, the interface 10 is connected or coupled to the thermostat 22 to receive the fan, heat, second airflow and valve signals. The interface 10 additionally receives a voltage signal, also shown in FIG. 5(a), which powers the thermostat 22. The voltage signal is available at a "V" terminal 46 (sometimes designated the "R" terminal).

The interface 10 is further coupled to the ECM 26, operatively interconnecting the thermostat 22 and the ECM 26. More particularly, the ECM 26 includes an on/off input 50, a heating input 52 and a high/low input 54, interconnected to the interface 10.

Referring to FIG. 4, the interface 10 includes diodes 56-68, Zener diodes 70-74, resistors 76-94, transistor 96, and light-emitting diodes ("LED") 98-102, interconnected as shown. In accordance with and in response to the four thermostatic signals, as well as the voltage signal, the interface 10 provides an ENABLE signal at the on/off input 50, a HEATING signal at the heating input 52, and a RATE signal at the high/low input 54.

More particularly, the interface 10 includes first means, generally designated 104, for providing an EN-ABLE signal at the on/off input 50 in response to a fan signal or in response to a heat signal, as issued by the thermostat 22. The first means 104 is cooperatively defined by the diodes 56, 58, the Zener diode 70 and the interconnections shown.

The diodes 56, 58 further define first protection means generally designated 106. The first protection means 106 substantially avoids feedback of the fan and heat signals to the thermostat 22. In other words, the first protection means 106 prohibits transmission of either the fan signal or the heat signal from the interface 10 back to the thermostat 22.

The Zener diode 70 blocks any voltage present at the "F" terminal 40 of the thermostat 22 due to leakage or an anticipator resistor (not shown). Even when cooling of the enclosure 14 is not required, a small voltage is typically found at the "F" terminal 40, whether the thermostat 22 is mechanical or electrical. The Zener diode 70 avoids activation of the ECM 26 until a legitimate fan signal is issued by the thermostat 22.

In this preferred embodiment, the ECM 26 is enabled by a positive voltage signal at the on/off input 50. Absence thereof disables and deactivates the ECM 26. The ENABLE signal has the waveform shown in FIG. 5(b) and it is derived directly from the fan or heat signals, subject to the limiting operation of the diodes 56, 58 and the Zener diode 70.

The interface 10 further includes second means, generally designated 108, for providing a HEATING signal at the heating input 52 of the ECM 26. The HEATING signal causes the ECM 26 to operate at a predetermined heating airflow rate, which is typically the lowest speed of the ECM 26. This heating airflow rate is often set at the factory, but it may be adjusted on the site by the installer depending on the particular application. The ECM 26 operates at the heating airflow rate in the presence of the HEATING signal, regardless of the status of the high/low input 54. That is, priority is given to the heating input 52 over the high/low input 54.

The second means 108 includes the diodes 60-66, resistors 76, 78, transistor 96 and interconnections. The second means 108 causes the ECM 26 to run at the heating airflow rate whenever supplemental heat is sought. As shown, the second means 108 receives the heat signal from the thermostat 22, as well as the valve and voltage signals. The heat signal is partially passed by the diode 60 to the heating terminal 52, and the voltage waveform so passed, i.e., the HEATING signal, is shown in FIG. 5(c).

The second means 108 further monitors the valve signal and provides a HEATING signal whenever the heat pump 16 is in the heating mode. In this preferred embodiment, the transistor 96 conducts only when there is no valve signal. When the transistor 96 conducts, the diode 66 passes a voltage in the form shown in FIG. 5(c) to the heating input 52.

The diodes 60, 66 cooperatively define second protection means, generally designated 110. This second protection means 110 substantially avoids feedback between the "Y" and "RV" terminals 42, 48 of the thermostat 22.

The interface 10 additionally includes third means, generally designated 112, for providing a RATE signal at the high/low input 54 of the ECM 26. The third means 112 is cooperatively defined by the back-to-back Zener diodes 72, 74 and interconnections.

In this preferred embodiment, the ECM 26 operates at a first set cooling airflow rate in response to a zero voltage RATE signal and at a second set, higher airflow rate response to a non-zero voltage RATE signal. The back-to-back Zener diodes 72, 74 substantially eliminate the small voltage present at the "M2" terminal 45 (due to the anticipator resistor or current leakage), thereby substantially avoiding inadvertent high speed operation. The non-zero voltage waveform received at the high/low input 54 is shown in FIG. 5(d).

In this preferred embodiment, the interface 10 also includes service means, generally designated 114, and cooperatively defined by the diode 60, resistors 90-94 and LED's 98-102. The service means 114 is connected to the ECM inputs 50-54 and provides a visual display of interface operation to facilitate diagnosis and repair.

In particular, the LED's 98-102 are illuminated by the ENABLE, HEATING and RATE signals, respectively. The resistors 90-94 limit current through the LED's 98-102, respectively, and the diode 69 limits the reverse voltage across the LED 98.

Figure 6:
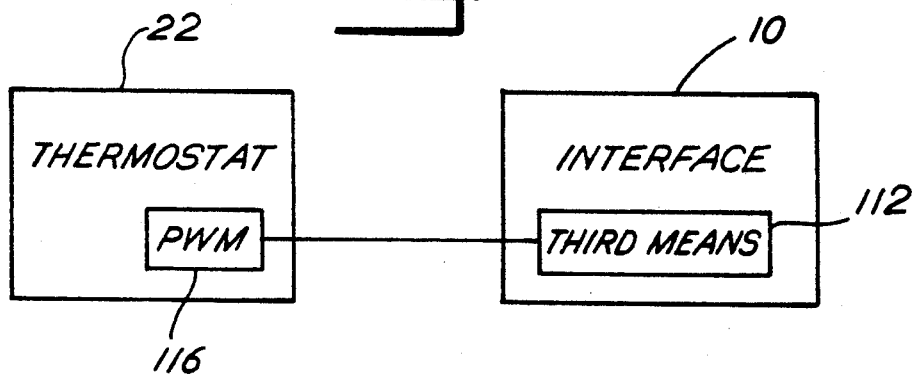
FIG. 6 is a schematic diagram of a second embodiment of the present invention.
Figure 7:
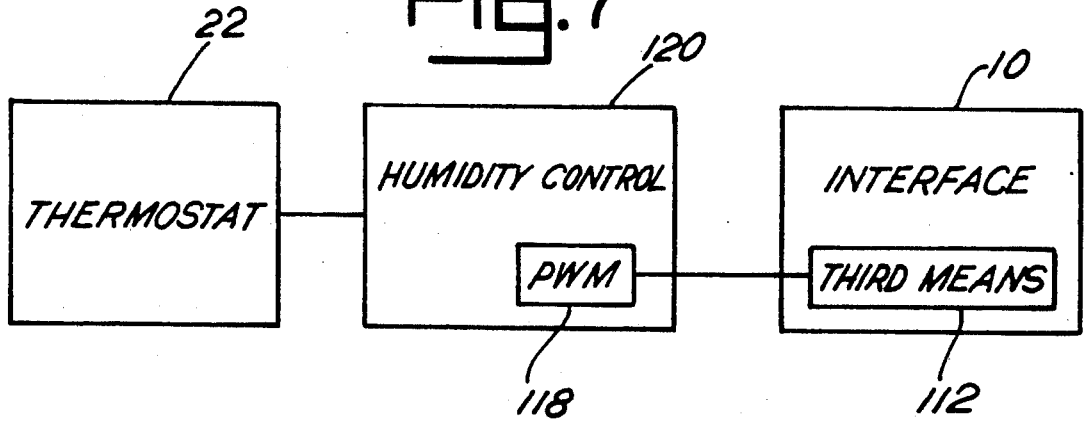
FIG. 7 is a schematic diagram of a third embodiment of the present invention.

The interface 10 may also be utilized with a thermostat 22 which provides, directly or through an intermediate mechanism, a PWM airflow rate signal In response to such a rate signal, the ECM 26 operates at a cooling speed within a continuous range of CFM's. In these preferred embodiments, shown schematically in FIGS. 6 and 7, the PWM signal is received by the third means 112 of the interface 10 from either the PWM output 116 of the thermostat 22 or the output 118 of the intermediate mechanism such as a humidity control 120.

The RATE signal provided by the third means 112 to the ECM 26 is a derivative of the received PWM signal, subject to operation of the Zener diodes 72, 74. This operation does not significantly alter the PWM signal or the resulting CFM of the ECM 26.

Preferred embodiments of the present invention have been described herein. It is to be understood, however, that changes may be made without departing from the true scope and spirit of the present invention, as defined by the following claims to be interpreted in accordance with the foregoing.

What is claimed is:

1. An interface for operably interconnecting a thermostat of an air processing apparatus and an electronically commutated motor forming a part of an air moving system, said air processing apparatus including a heat pump/air conditioner controlled by a valve signal, said thermostat providing said valve signal, a fan signal, a heat signal and an airflow signal, said electronically commutated motor having an on/off input, a heating input, and a high/low input, comprising, in combination:
   first means for providing an ENABLE signal at said on/off input in response to said fan signal or in response to said heat signal, said ENABLE signal enabling said electronically commutated motor;
   second means for providing a HEATING signal at said heating input in response to said heat signal and in response to said valve signal whenever said valve signal indicates said heat pump/air conditioner is in a heating mode, said electronically commutated motor operating at a predetermined heat speed in response to said HEATING signal; and
   third means for providing a RATE signal at said high/low input in response to said airflow signal from said thermostat, said electronically commutated motor being operable at one of at least two predetermined airflow rates in response to said RATE signal.

2. An interface as claimed in claim 1 wherein said first means includes first protection means for substantially avoiding feedback of said fan signal and said heat signal through said interface to said thermostat.

3. An interface as claimed in claim 2 wherein said second means includes second protection means for substantially avoiding feedback of said heat signal and said valve signal through said interface to said thermostat.

4. An interface as claimed in claim 3 wherein said first means further includes a Zener diode coupled to said on/off input.

5. An interface as claimed in claim 3 wherein said third means includes back-to-back Zener diodes.

6. An interface as claimed in claim 1 wherein said airflow signal is a pulse width modulated signal, and said RATE signal is a derivative thereof.

* * * * *